United States Patent
Chiou et al.

(10) Patent No.: US 6,577,625 B1
(45) Date of Patent: Jun. 10, 2003

(54) ETHERNET SWITCH WITH A SHARE MEMORY STRUCTURE AND METHOD FOR SHARING MEMORY

(75) Inventors: Bin-Chi Chiou, Miaoli Hsien (TW); Tse-Yu Chen, Changhua (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/200,362

(22) Filed: Nov. 25, 1998

(30) Foreign Application Priority Data

Jun. 22, 1998 (TW) ........................... 87109990 A (51) Int. Cl.[7] ............................................. H04L 12/50
(52) U.S. Cl. ........................................ 370/381; 370/352
(58) Field of Search ................................ 370/352–356, 370/360, 363, 371, 374, 378, 379, 381, 389, 396, 398, 395.7, 395.72, 400, 412, 422

(56) References Cited

U.S. PATENT DOCUMENTS

| | | | | |
|---|---|---|---|---|
| 5,633,865 A | * | 5/1997 | Short .......................... | 370/412 |
| 5,812,775 A | * | 9/1998 | Van Seters et al. ...... | 395/200.43 |
| 5,909,564 A | * | 6/1999 | Alexander et al. .......... | 395/311 |
| 6,067,300 A | * | 5/2000 | Baumert et al. ............. | 370/413 |

* cited by examiner

*Primary Examiner*—Wellington Chin
*Assistant Examiner*—Brenda Pham
(74) *Attorney, Agent, or Firm*—J.C. Patents (57) ABSTRACT

An Ethernet switch having a share memory structure in which the share memory reads/writes packet data and records network routing data when switching packet data among network ports. Furthermore, a buffer manager in coordination with a buffer table is provided to manage the memory by a sharing memory method. The Ethernet switch includes a memory device, a memory controller, a data switching controller and more than two network ports. Furthermore, the memory device provides network packets accesses and routing data storage. The memory controller is coupled to the memory device for managing/controlling network packets in the memory device. The data switching controller is coupled to the memory device for selecting/learning packet routings. Each network port is coupled to the memory controller and data switching controller.

15 Claims, 9 Drawing Sheets

ETHERNET SWITCH WITH A SHARE MEMORY STRUCTURE AND METHOD FOR SHARING MEMORY

CROSS-REFERENCE TO RELATED APPLICATION

This application claims the priority benefit of Taiwan application serial No. 87109990, filed Jun. 22, 1998, the full disclosure of which is incorporated herein by reference.

BACKGROUND OF THE INVENTION

1. Field of the Invention

The invention relates to an Ethernet element, and more particularly to an Ethernet switch.

2. Description of Related Art

Currently, Ethernet, a most common Local Area Network (LAN), has been used in information communication network market. In early time, the structure of Ethernet was implemented by means of 10BASE5, called a Bus Topology Network. Furthermore, 10BASE2 is a cost-saving and revised form of the 10BASE5.

Although the 10BASE2 is also a Bus Topology Network and operates at a frequency of 10 MHz, a coaxial cable used has different properties and the maximum of transmission length is limited to less than 200 m. There are many disadvantages exiting in the structure of the 10BASE5 or 10BASE2. For example, cost for installing is higher; the installing for the 10BASE5 or 10BASE2 network is inflexible; and distribution line systems in buildings can not be effectively used. To solve the disadvantages mentioned above, 10BASE-T, a Star Topology Network system established by use of twin-stranded wires, is used.

The larger the structure of Local Area Network is, the more the amount of transmitting on the Local Area Network will be. When the number of nodes for connections on the Local Area Network is increased, the efficiency of the Ethernet is decreased. In order to satisfy the requirements of the large structure of the Local Area Network or high-speed data terminal equipment, a high-speed Ethernet operating at a higher frequency is provided. The high-speed Ethernet which operates at a frequency of 00 MHz, further enhances the functions of the Ethernet network 10BASE. In the high-speed Ethernet, a media independent interface (MII) is defined. Therefore, the high-speed Ethernet can be connected to another network, such as 100BASE-TX, 100BASE-T4 or 100BASE-FX, by using twin-stranded wires or fiber optical cables via network nodes.

Basically, the 10BASE5, 10BASE2, 10BASE-T, 100Base-TX, 100BASE-T4 or 100BASE-FX is a sharing bandwidth network system. All connected nodes on the network system can share the bandwidth thereof. The bandwidth of the network system 10BASE is 10 MHz while the bandwidth of the 100BASE is 100 MHz. When the number of the nodes connected is over a threshold value, the performance of the sharing network system reaches a best condition. A segmenting methodology, different from the method of accelerating operating pulse frequency, is used to improve the functions of the Ethernet system. The segmenting methodology segments the entire network system into several separated sub-networks. Each separated sub-network is located within a different range of collision domain. Nodes connected to different sub-networks are unable to share the bandwidths of the sub-networks with each other. If the network system is not segmented, each node of the Local Area Network 100BASE having 100 share nodes can share a bandwidth of 1 MHz only. However, if the system having 100 nodes is divided into 2 segments, each node of the Local Area Network 100BASE can share a bandwidth of 2 MHz. A segmented Local Area Network system having an Ethernet protocol is also called a switched Ethernet. Packets transmitted between the two segments of the network system are switched by use of an Ethernet switch. The Ethernet switch is used to switch packets between different segments of the local Area Network system. Packets transmitted from one segment to another segment is forwarded, but packets in the same segment transmitted from one node to another node will not be switched. These prior arts all are disclosed in U.S. Pat. No. 5,274,631, 5,491,694 and 5,588,151.

Figure 1:
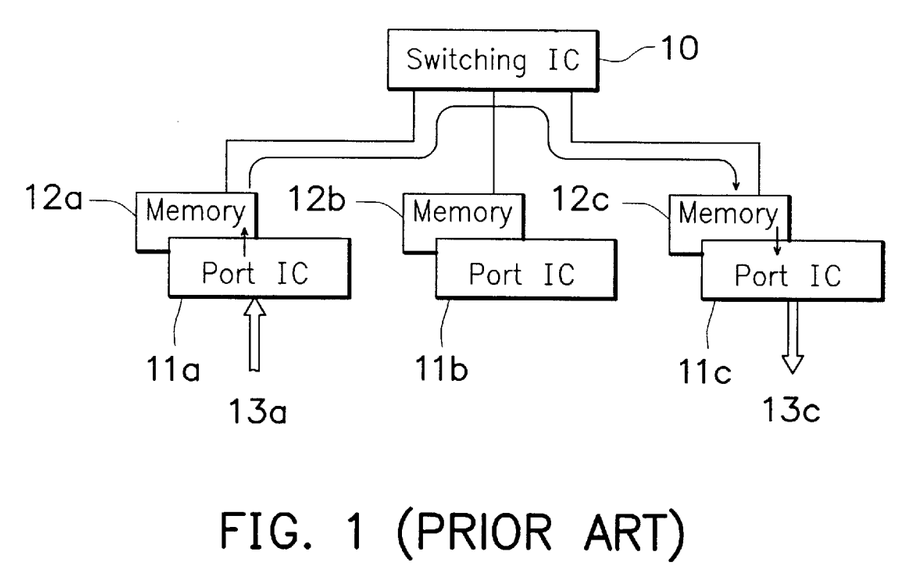
FIG. 1 is a circuit block diagram showing an Ethernet switch having a distribution memory structure according to the prior art.

FIG. 1 is a circuit block diagram showing an Ethernet switch having a distribution memory structure according to the prior art.

Referring to FIG. 1, the prior Ethernet switch includes at least a switching IC 10 and a plurality of port ICs 11a, 11b and 11c. The switching IC 10 is used for data switching and transmitting control of each port. Each port IC has a memory. For example, the IC port 11a has a built-in memory 12a which is used to store and switch packet data. In the structure of the switch, when network data are transmitted from a port 13a to a port 13c, the data must be first stored in the memory 12a and then stored in a memory 12c. As shown in FIG. 1, the size of the memory of each port IC must have been previously decided when designed. Since any port of the network switch is likely connected to a Local Area Network, such as 10BASE5, 10BASE2, 10BASE-T, 100BASE-TX, 100BASE-T4 or 100BASE-FX, with a different specification, each port IC should be given a larger storage capacitance of memory for being suitable for different specifications. Therefore, more memory consumption is caused. Furthermore, data transmission must be implemented through two memories, such that the efficiency of the network switch is decreased.

SUMMARY OF THE INVENTION

In view of the above, the first object of the invention is to disclose a function of connecting a network system 10BASE to a network system 100BASE, thereby extending the uses of the old system to new system.

The second object of the invention is to disclose an Ethernet switch having a share memory structure for saving required memories of the switch.

In addition, the third object of the invention is to disclose a method for accomplishing the functions, of the switch. The method includes: sharing memory; storing a packet buffer pool; handling packet buffer pool congestion; and switching network packets.

According to the invention, the Ethernet switch having a share memory structure is provided for selectively transmitting network packets. The switch includes: a memory device, a memory controller, a data switching controller and more than two network ports. Furthermore, the memory device provides network packet accesses and stores routing data. The memory controller is coupled to the memory device for managing/controlling network packets in the memory device. The data switching controller is coupled to the memory controller for packet routing/learning. Each network port is coupled to the memory controller and data switching controller. The Ethernet switch of the invention has an advantage of saving required memories thereof.

The main object of the invention is to provide an Ethernet switch having a share memory structure for selectively transmitting network packets. The switch includes: a routing table; a packet buffer; a share memory access controller; a data switching controller; more than two network ports; and a buffers manager. Moreover, the share memory access controller coupled to the routing table and the packet buffer consists of a means for arbitrating, a means for data multiplexing, a means for addressing, and a means for access command controlling. The data switching controller coupled to the share memory access controller consists of a means for initializing, a means for arbitrating and a means for aging the routing table, and network routing/learning. Each network port is coupled to the share memory access controller and the data switching controller. The buffer manager is coupled to each network port. The buffer table is coupled to the buffer manager. The routing table is used to store routing data of packets by means of the share memory access controller. The packet buffer accepts packet accesses requested by each network port by use of the share memory access controller. The buffer table records the use statuses of the packet buffer by means of each network port and the share memory access controller. The buffer manager learns the use statuses of packet buffer in virtue of each network port and the share memory access controller, thereby managing the packet buffer.

According to a preferred embodiment of the invention, a memory device includes a routing table and a packet buffer. The routing table coupled to a memory controller is used to store routing data of a data switching controller via the memory controller. The packet buffer coupled to the memory controller is used to accept packet accesses requested by each network port via the memory controller.

According to a preferred embodiment of the invention, the memory controller includes a memory interface and a memory manager. The memory interface coupled to the memory device, data switching controller and each network port is used to control the accesses of the memory device. The memory manager coupled to each network port is used to manage the memory device by means of the memory interface.

According to another preferred embodiment of the invention, a memory manager includes a buffer table and a buffer manager. The buffer table records the use statuses of the memory device by means of each network port and a memory interface. The buffer manager is coupled to the buffer table for learning the use statuses of packet buffer, thereby managing the packet buffer.

According to a further embodiment of the invention, a data switching controller includes a routing controller and a learning controller. The routing controller is used for packet routing of each network port. The learning controller is used to store packet routing data by means of the memory controller.

According to a preferred embodiment of the invention, the routing controller selectively selects a corresponding network port in response to the destination address data of received packets. In addition, the learning controller selectively selects a corresponding network port in response to the source address data of received packets.

According to one more embodiment of the invention, each network port includes an Ethernet communication protocol controller and a packet data access controller. The Ethernet communication protocol controller mainly accomplishes all functions specified by IEEE 802.3 section 4. The packet data access controller is used to receive and transmit packets.

According to a preferred embodiment of the invention, the Ethernet communication protocol controller includes a media independent interface, a reconciliation sub-layer and a media access controller. The media access controller has the functions of receiving and transmitting which meet the specifications of IEEE 802.3 section 4.

According to a preferred embodiment of the invention, the packet data access controller includes a receive direct memory access controller and a transmit direct memory access controller. The receive direct memory access controller is used to receive packets. The transmit direct memory access controller is used to transmit packets.

Another object of the invention is to provide a method for buffering and managing an Ethernet switch. The Ethernet switch includes a memory consisting of a routing table, a buffer manager and a plurality of network ports each of which includes a receive direct memory access controller and a transmit direct memory access controller. The method includes segmenting the memory device into a plurality of segments each of which is assigned with a buffer ID representing a corresponding packet position in the memory device; maintaining the linked list of buffer IDs by the buffer manager and dynamically assigning a buffer ID to each forwarded packet; assigning unused buffer IDs to the receive direct memory access controller by the buffer manager; and retrieving the buffer IDs from the transmit direct memory access controller by the buffer manager.

According to a preferred embodiment of the invention, the method further includes assigning a buffer ID by the receive direct memory access controller when any one of the network ports receives a packet; and selecting the corresponding transmit direct memory access controller of the network port to transmit the packet according to the buffer ID corresponding to the packet if the packet is to be forwarded.

According to another embodiment of the invention, the method further includes performing a congestion control, wherein if the sum of the number of packets remaining to reach a minimum of threshold value for each packet port where the number of transmission-waiting packets does not reach the minimum of threshold value is larger or equal to a predetermined value, the other network ports in each of which the number of transmission-waiting packets is larger or equal to a minimum of threshold value are prevented from increasing the number of transmission-waiting packets by the congestion control.

According to one more embodiment of the invention, the method further includes performing a congestion control, wherein the number of transmission-waiting packets of any one of the network ports is larger or equal to a maximum of threshold value, the network port is prevented from increasing the number of transmission-waiting packets by the congestion control.

One more object of the invention is to provide a method for buffering and managing an Ethernet switch. The Ethernet switch includes a memory consisting of a routing table and a packet buffer, a buffer manager and a plurality of network ports each of which includes a receive direct memory access controller and a transmit direct memory access controller. The method includes establishing a Free-List by presenting the packet buffer in a form of linked list, wherein a Free-Header register is used to point out the header index of the unused packet buffers and a Free-Tail register is used to point out the tail index of the unused packet buffers; transmitting the buffer index of the Free-Header register to the interface of a corresponding receive direct memory access controller when the interface of each receive direct memory access controller emits a packet buffer request; then, adding the buffer index of the interface of the receive direct memory access controller to the tail of a transmitting linked list of the network port when each packet switching operation is performed; sending the buffer index in the Head register of a TX-List to the interface of the transmit direct memory access controller if the FX-List is not empty when each transmit direct memory access controller emits a packet transmitting request; and retrieving the buffer index of the interface of the transmit direct memory access controller back to the Free-Tail register when each transmitting operation is completed and then informing the transmit direct memory access controller that retrieving is completely finished.

According to a preferred embodiment of the invention, the method further includes performing a congestion control, wherein if the sum of the number of packets remaining to reach a minimum of threshold value for each network port where the number of transmission-waiting packets does not reach the minimum of threshold value is larger or equal to a predetermined value, other network ports in which the number of transmission-waiting packets is larger or equal to a minimum of threshold value are prevented from increasing the number of transmission-waiting packets by the congestion control, and the buffer index of the Free-Header register is no longer transmitted to the interfaces of receive direct memory access controllers corresponding to the network ports until this condition disappears.

According to one more embodiment of the invention, the method further includes performing a congestion control, wherein the number of transmission-waiting packets of any one of the network ports is larger or equal to a maximum of threshold value, the network port is prevented from increasing the number of transmission-waiting packets by the congestion control.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

FIG, 4 is a circuit block diagram showing a memory device according to a second embodiment of the invention.

DETAILED DESCRIPTION OF THE EMBODIMENTS

Figure 2:
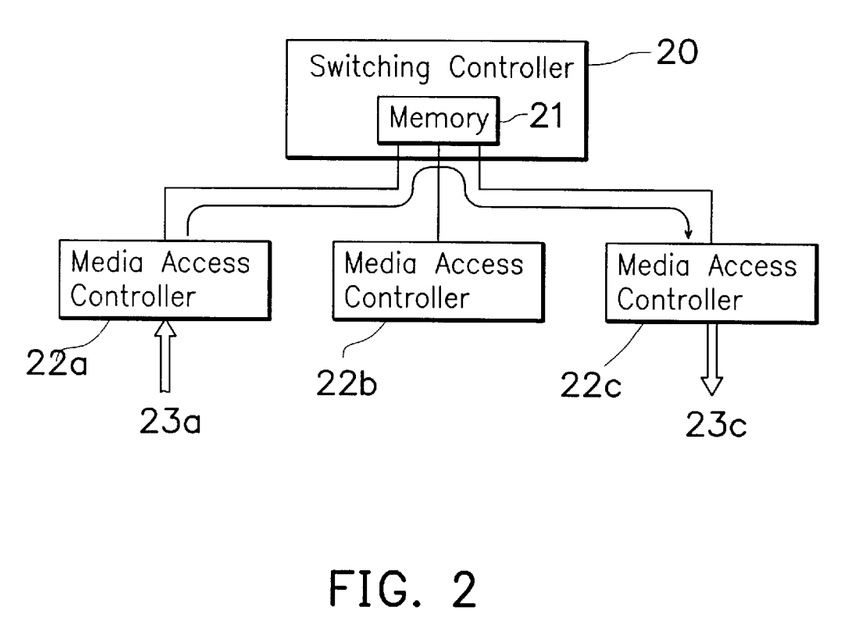
FIG. 2 is a circuit block diagram showing an Ethernet switch having a share memory structure according to a first embodiment of the invention.

Referring to FIG. 2, an Ethernet switch according to a first embodiment of the invention includes a switching controller (switching IC) 20 and a plurality of media access controllers (MACs) 22a, 22b and 22c at least. The switching IC 20 has a share memory 21 for controlling data switching transmissions of individual network port of the media access controllers. In the structure of the switch according to the invention, when data need to be transmitted from a network port 23a to a network port 23c, the data is first stored in the memory 21 via the media access controller 22a, and then fetched out from the memory 21 via the media access controller 22c. As shown in FIG. 2, the memory 21 is shared by all media access controllers. Therefore, the memory is able to be more efficiently used, resulting in cost saving. Furthermore, since the data of individual network port are directly read/written from/to the share memory 21, a new method for switching packets is provided.

Figure 3:
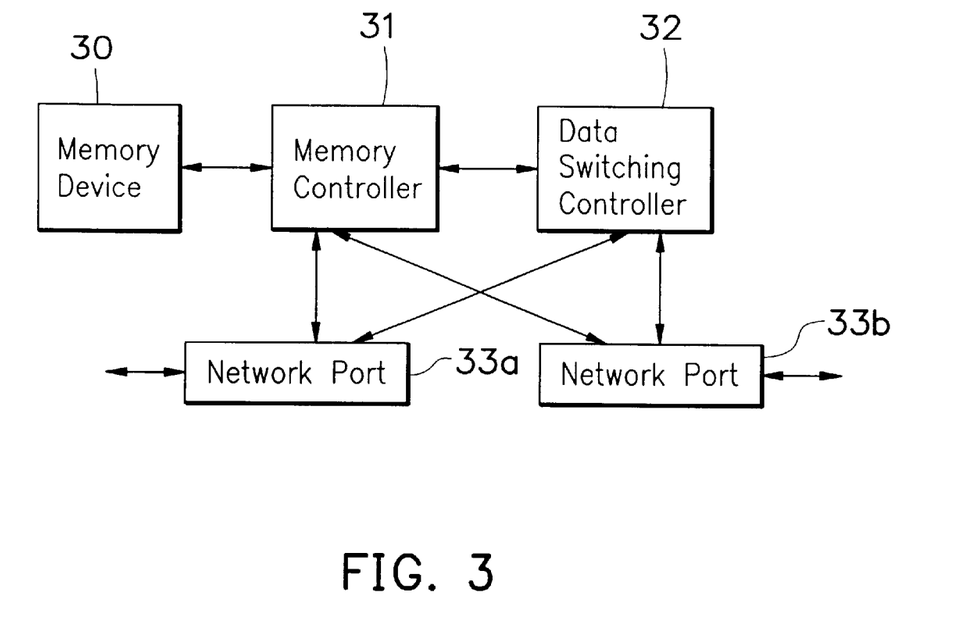
FIG. 3 is a circuit block diagram showing an Ethernet switch according to a second embodiment of the invention.

Referring to FIG. 3. an Ethernet switch according to a second embodiment of the invention includes a memory device 30, a memory controller 31, a data switching controller 32 and a plurality of network ports (for example, network ports 33a and 33b). The memory device 30 is used for packet data accesses and routing data storage. The memory controller 31 is used to manage received packet data in the memory 30. The data switching controller 32 is used to select and learn packet data routings. The network ports 33 and 33b meet an Ethernet communication protocol, such as the specifications of IEEE 802.3 section 4.

As shown in FIG. 3, it explains the relationship of connections among devices in the Ethernet switch. The memory controller 31 is coupled to the memory device 30; the data switching controller 32 is coupled to the memory controller 31; a first network port 33a is coupled to the memory controller 31 and the data switching controller 32; and a second network port 33b is coupled to the memory controller 31 and the data switching controller 32.

Figure 4:
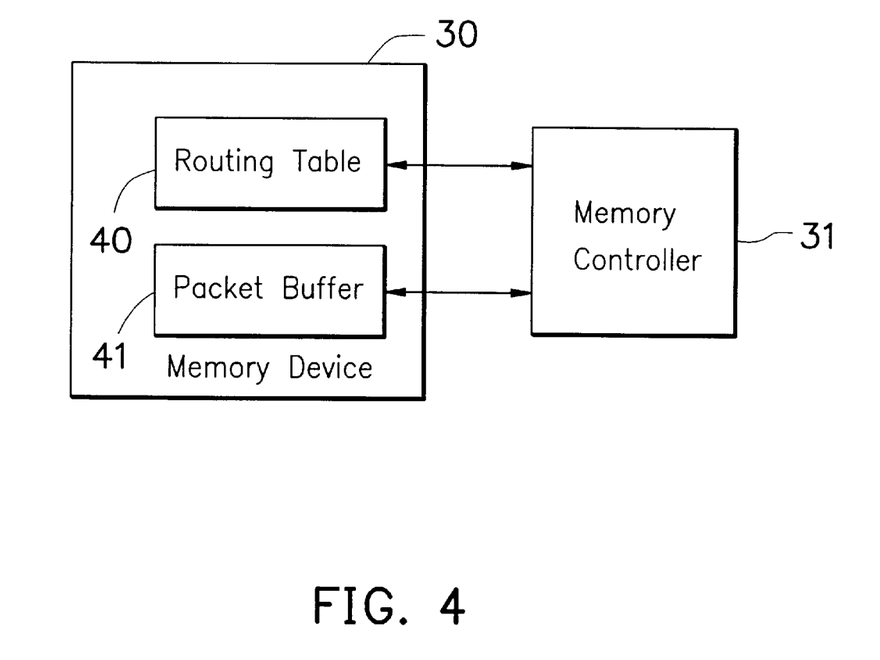

Referring to FIG. 4, the memory device 30 includes a routing table 40 and a packet buffer 41. The routing table 40 coupled to the memory controller 31 stores routing data of the data switching controller 32 via the memory controller 31. The packet buffer 41 coupled to the memory controller 31 allows the packet data accesses of the first network port 33a and the second network port 33b.

Figure 5:
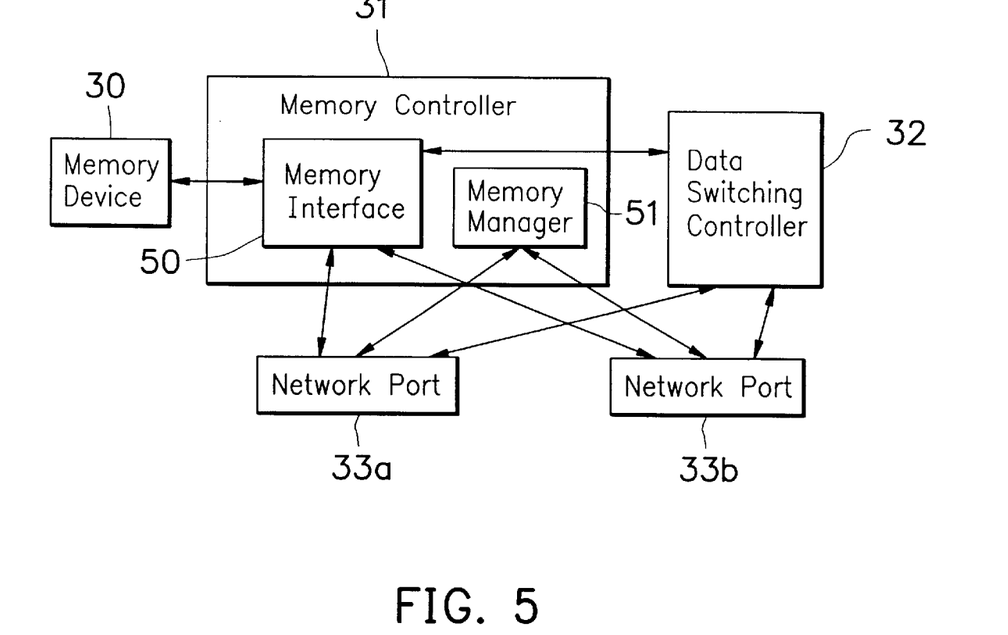
FIG. 5 is a circuit block diagram showing a memory controller according to a second embodiment of the invention.
Figure 6:
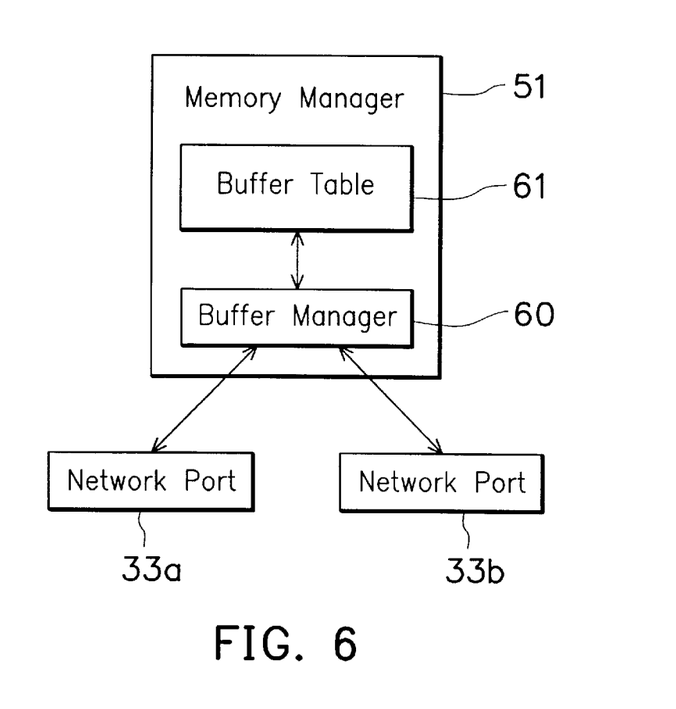
FIG. 6 is a circuit block diagram showing a memory manager according to a second embodiment of the invention.

As shown in FIG. 5, the memory controller 31 includes a memory interface 50 and a memory manager 51. The memory interface 50 coupled to the memory device 30, the data switching controller 32, the first network port 33a and the second network port 33b is used to control the data accesses of the memory device 30. That is, the memory interface 50 functions as a data transmitting interface of the memory device 30 and all the other devices mentioned above. Referring to FIG. 6, the memory manager 51 for managing the memory device 30 includes a buffer manager 60 and a buffer table 61. The buffer table 61 records use statuses of the memory device 30 by means of the network port 33a or 33b and the memory interface 50. The buffer manager 60 is coupled to the buffer table 61 so as to learn use statuses of the packet buffer 41, thereby managing packet buffer 41.

Figure 7:
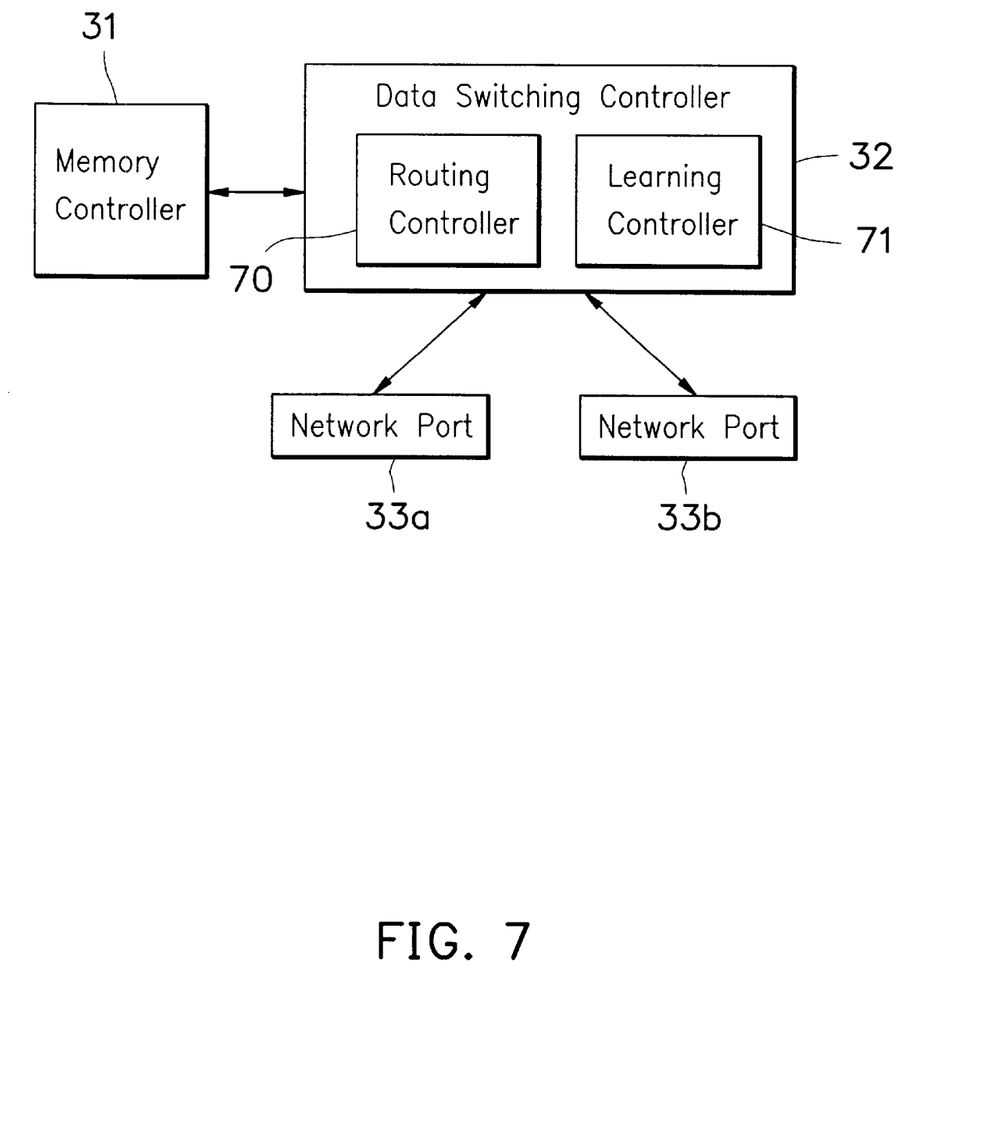
FIG. 7 is a circuit block diagram showing a data switching controller according to a second embodiment of the invention.

Referring to FIG. 7, the data switching controller 32 includes a routing controller 70 and a learning controller 71. The routing controller 70 is used to select data transmitting routes of the network ports 33a and 33b. Furthermore, the learning controller 71 stores a data transmitting route in the routing table 40 of the memory device 30 via the memory controller 31. The routing controller 70 selectively selects a corresponding network port in response to the destination address data of received packets. The learning controller 71 selectively select a corresponding network port in response to the source address data of received packets.

Figure 8:
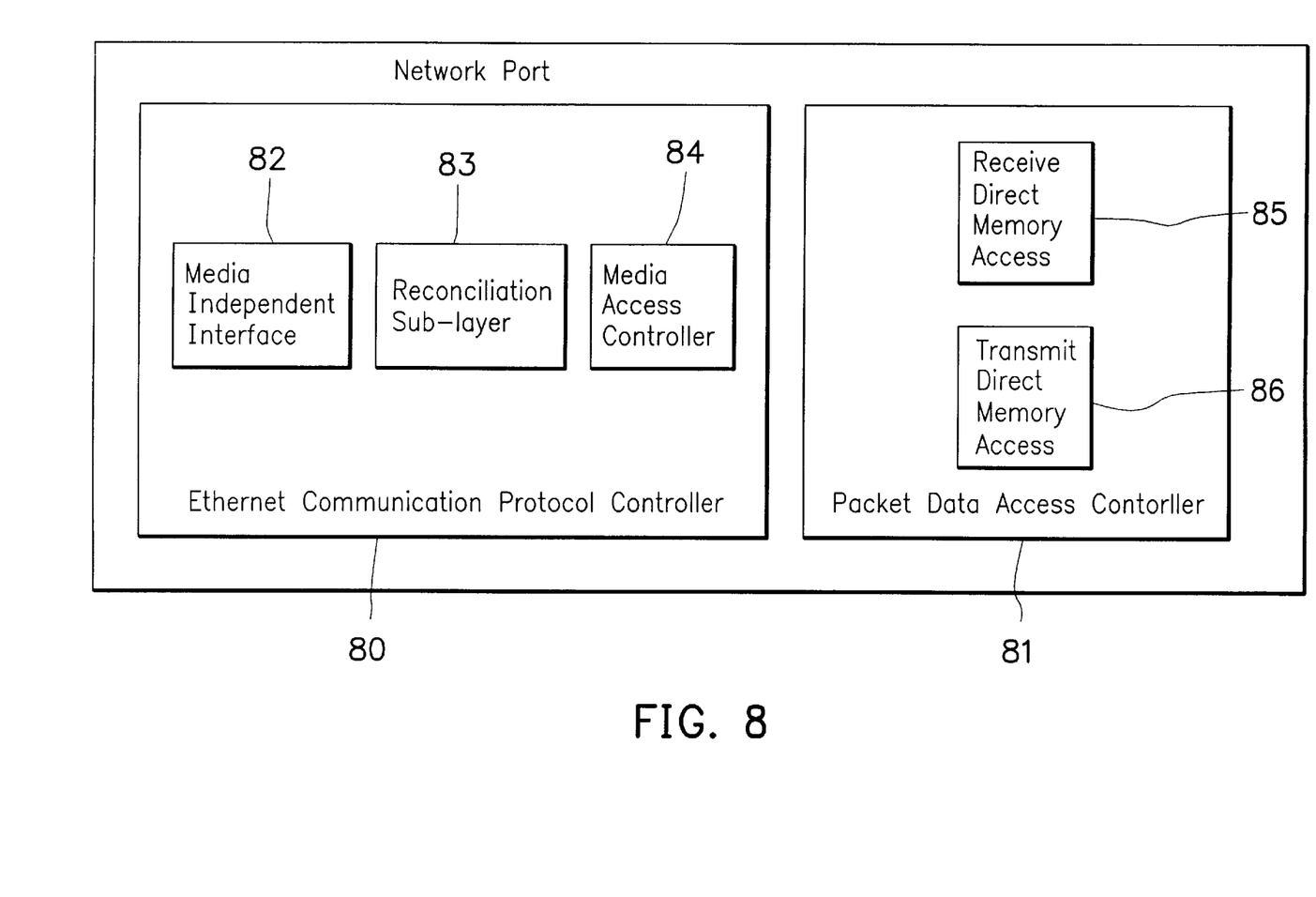
FIG. 8 is a circuit block diagram showing a network port according to a second embodiment of the invention.

Referring to FIG. 8, any one of network ports 33a and 33b includes an Ethernet communication protocol controller 80 and a packet data access controller 81. The Ethernet communication protocol controller 80 which mainly accomplishes the functions specified by IEEE 802.3 section 4, includes a media independent interface (MII) 82 and a reconciliation sub-layer 83 and a media access controller (MAC) 84. The packet data access controller 81 includes a receive direct memory access (RxDMA) 85 and a transmit direct memory access (TxDMA) 86. The media access controller 84 has the functions of receiving and transmitting which meet the specifications of IEEE 802.3 section 4.

Figure 9:
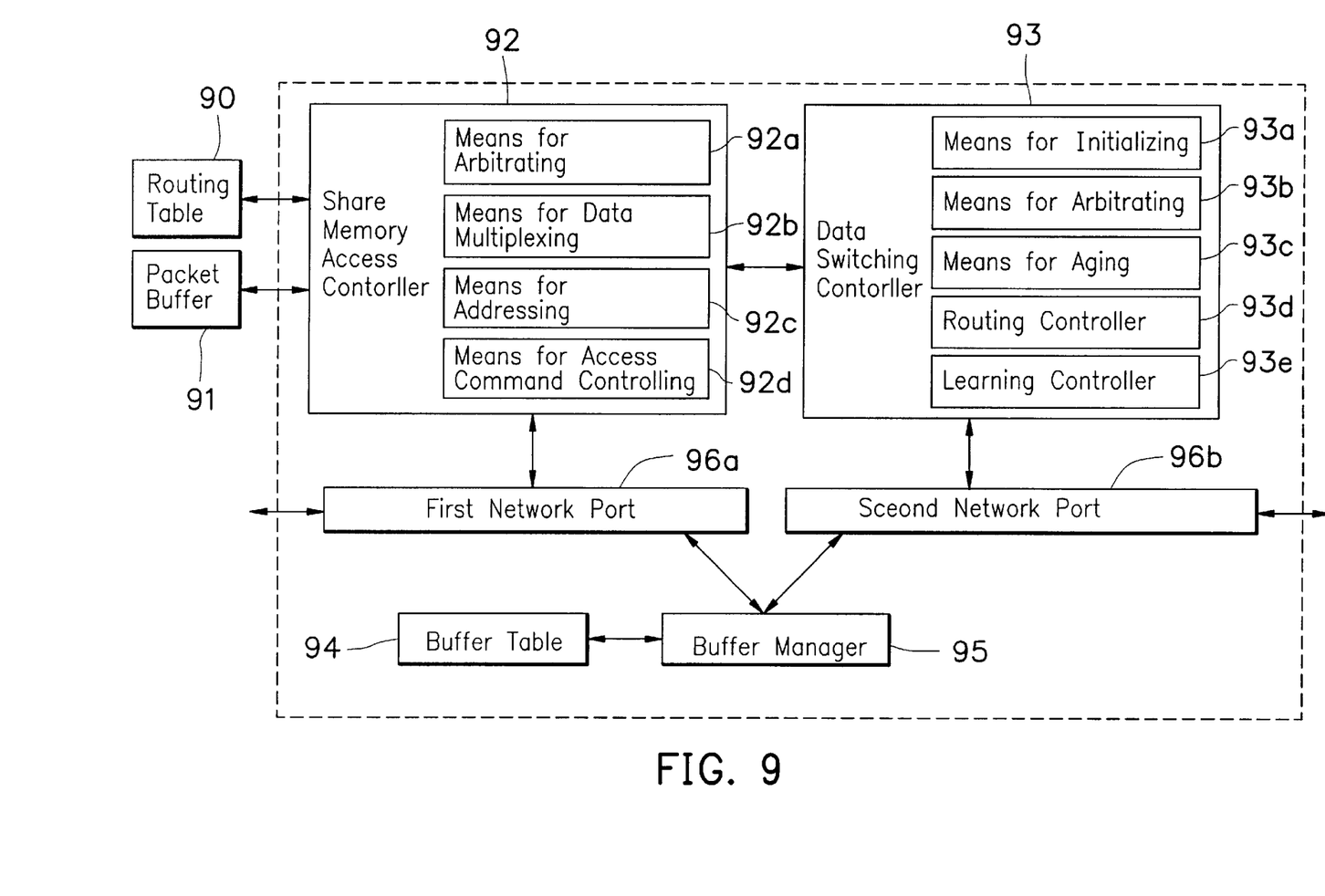
FIG. 9 circuit block diagram showing an Ethernet switch according to a third embodiment tile invention.

Next, referring to FIG. 9, an Ethernet switch according to a third embodiment of the invention is shown.

As shown in FIG. 9, the Ethernet switch according to the third embodiment of the invention includes a routing table 90, a packet buffer 91, a share memory access controller 92, a data switching controller 93, a buffer manager 95, a buffer table 94, a first network port 96a and a second network port 96b.

In FIG. 9, the share memory access controller 92 consists of a means 92a for arbitrating, a means 92b for data multiplexing, a means 92c for addressing and a means 92d for commanding. The data switching controller 93 consists of a means 93a for initializing, a means 93b for arbitrating and a means 93c for aging routing table 90 as well as a routing controller 93d and a learning controller 93e. Moreover, the other devices in FIG. 9, such as the routing memory 90, packet buffer 91 buffer manager 95, buffer table 94, first network port 96a and second network port 96b, are the same as those described in the second embodiment.

First, the buffer manager 95 will be described hereinafter. A memory (for example, with a capacitance of 512 K or 256 K bytes) used by the buffer manager 95 can be divided into 341 or 170 blocks (1.5 K bytes/block). A Buffer ID assigned to each block represents a corresponding packet position in the memory. Furthermore, buffer IDs 0~21 are specified to use in the routing table 90. The buffer manager 95 maintains the linked list of the buffer IDs. The buffer IDs are dynamically assigned to each forward packet. Free buffer IDs are assigned to receive direct memory access controllers by the buffer manager. Before an input packet is appearing, a receive direct memory controller requests a new buffer ID for packet receiving. Furthermore, if the packet is forwarding, the transmit direct memory access controller transmits the packet in accordance with the buffer ID corresponding to the packet. After the packet is transmitted, the buffer ID is retrieved by the buffer manager.

Also, the buffer manager 95 performs a congestion control function. If the number of incoming packets is larger than that of outgoing packets, the free buffer IDs are greatly decreased. When a network port depletes the previously-reserved free buffer IDs, the buffer manager 95 emits a congest control alarm signal.

Consequently, the buffer table 94 will be described in the following. The buffer table 94 built in a chip functions as a linked list of free buffer IDs and packet buffer IDs. Each network port has its own linked list of packet buffer IDs, thereby forming a transmitting sequence. In addition, a free buffer ID linked list is shared only by two network ports.

Figure 10:
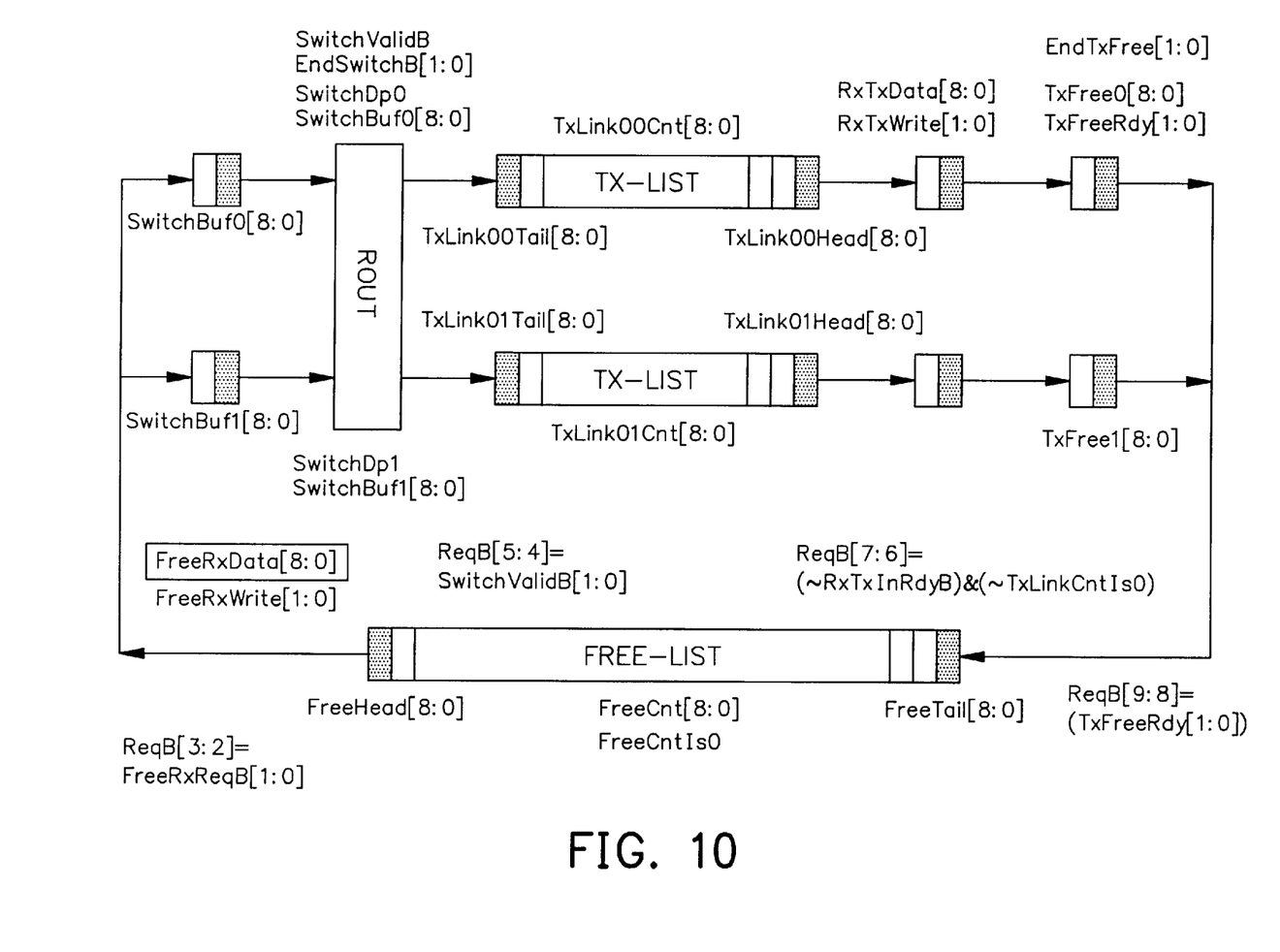
FIG. 10 is a schematic view showing the structure of a buffer manager according to a third embodiment of the invention.

Furthermore, referring to FIG. 10, a method for sharing memory by an Ethernet switch according to a third embodiment of the invention is show. As shown in FIG. 10, the combinations of free buffer IDs are organized into a linked list. A FreeHead register and a FreeTail register are used to point out the head ID and tail ID of a Free-List. At an initial state, other free buffer IDs are connected to each other in order. When RxDMA emits FreeRxReqB, a buffer ID pointed out by the FreeHead register is assigned to the RxDMA. FreeRxData and Free RxWrite represent the data of buffer ID and written signal, respectively. When the process of filtering/forwarding packets is completed, SwitchValidB coming from RxDMA represents that the packets will be forwarded and a buffer ID (SwitchBuf) is added to Tx-List by the buffer manager according to SwitchDp. When TxDMA sends out RxTxlnRdyB, and meanwhile the corresponding Tx-List is not empty, the head buffer ID of the Tx-List is fetched by the TxDMA for transmitting. RxTxData and RxTxWrite represent the data of buffer ID and written signals, respectively. After packets are transmitted, unused buffer IDs must be retrieved to the tail of the Free-List. If a TxFreeRdy request emitted by the TxDMA is allowed, buffer ID data (TxFree) are provided to FreeTail.

Figure 11:
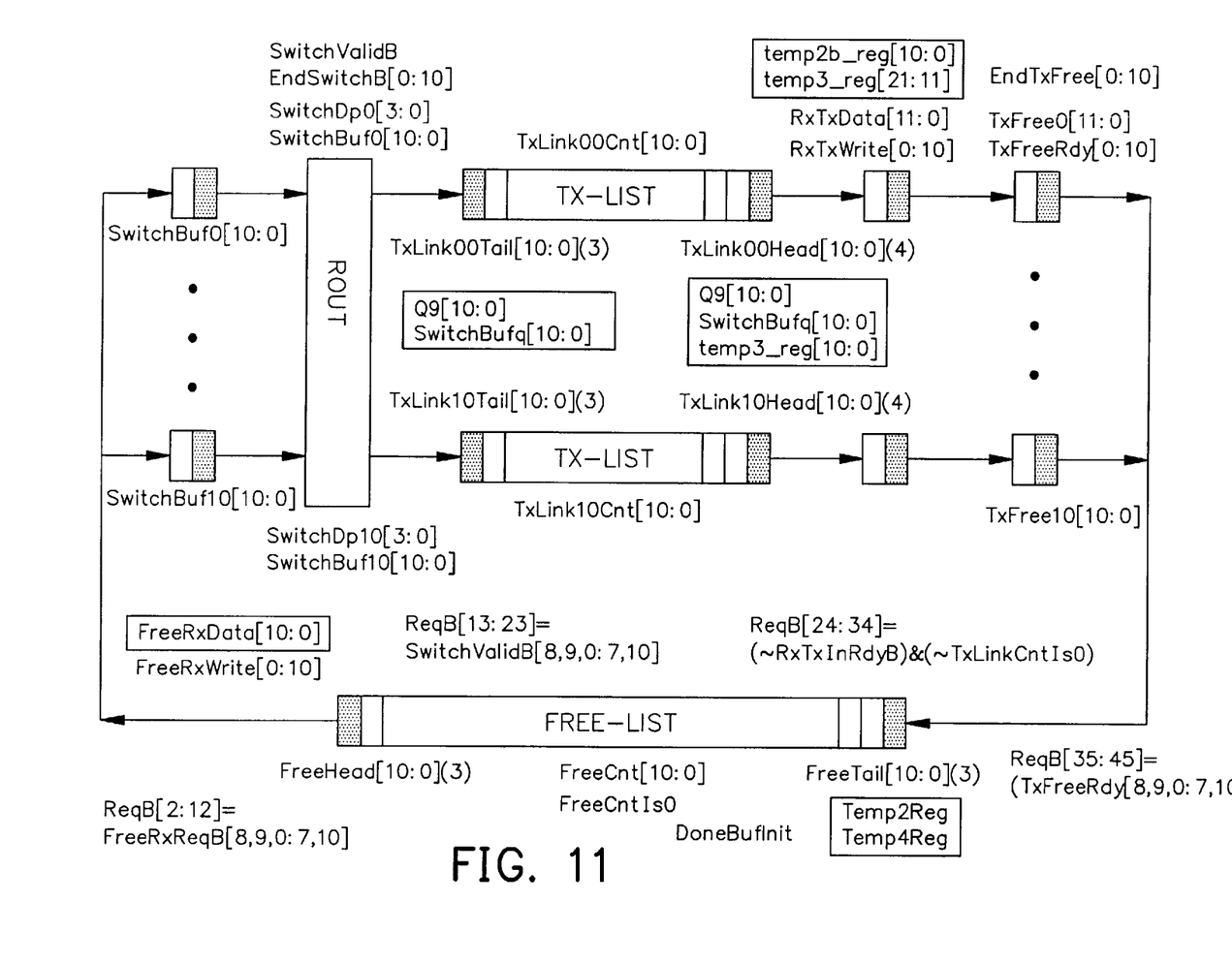
FIG. 11 is a schematic view showing the structure of a buffer manager according to a fourth embodiment of the invention.

Moreover, referring to FIG. 11, a method for buffering and managing memory by an Ethernet switch according to a fourth embodiment of the invention will be described hereinafter. The method includes the following steps.

(1) At an initial state, a Free-List is established in a form of linked list; the FreeHead register points out the head index of the packet buffer; and the FreeTail register points out the tail index of the packet buffer.

(2) When each RxDMA emits FreeRxReqB, the buffer index of the FreeHead is transmitted to the RxDMA by means of FreeRxData and FreeRxWrite.

(3) For each SwitchValidB, the buffer index of SwitchBuf is added to the tail of TxLink of a corresponding network port; SwitchDp is used to point out a network port; SwitchBufq is used to point out a buffer ID; Q9 is used to point out buffer IDs which need to be assigned to each network port; and EndSwitchB is used to determine whether or not switching is completely finished.

(4) For each RxTxlnRdyB, when TxLink is not empty, the buffer index (or buffer ID) in the Head register of the TxLink list is transmitted to TxDMA by means of RxTxData and RxTxWrite.

(5) For each TxFreeRdy, the buffer index transmitted from the TxDMA to TxFree is retrieved to FreeTail; and EndTxFree is used to determine whether or not retrieving is already finished.

Thereafter, a function of congestion control of the buffer manager will be described. When the network ports operate at a half-dualplex mode, the buffer manager executes the congestion control function. For each network port, when all transmission-waiting packets reach a predetermined threshold value, an alarm signal (FloodCrtl) is emitted. When the number of transmission-waiting packets of a network port has already reached the predetermined threshold value, if another network port receives a set of packets which need to be forwarded to a previous network port, this another network port emits a JAM form of packets to collide with incoming packets, so that remote network ports stop transmitting the incoming packets. This action not only prevents the packet buffer from overflowing, but also avoids the loss of packets.

The sum previously given by a maximum buffer ID depends on the wire speed of each network port. In addition, the 22 buffer IDs have to be assigned for use of a 32 K bytes of routing table.

In case of a 512 bytes of memory device, if all of two network ports operates at the same wire speed, the maximum number of transmission-waiting packets of each network port is set at 155. If one of two network ports operates at a 10 Mbps mode while the other network port operates at a 100 Mbps mode, the maximum number of transmission-waiting packets of the network port operating at a 100 Mbps mode is set at 278, and the threshold value of congestion control of the network port operating at a 10 Mbps mode is set at 32.

(1) In case of a 512 bytes of memory device, a list for setting congestion control threshold values, the maximum number of transmission-waiting packets, is shown in Table 1.

TABLE 1

| Network operation mode | Congestion control threshold value |
| --- | --- |
| 10 Mbps/10 Mbps | 155/155 |
| 100 Mbps/100 Mbps | 155/155 |
| 10 Mbps/100 Mbps | 278/32 |
| 100 Mbps/10 Mbps | 32/278 |

(2) In case of a 216 bytes of memory device, a list for setting congestion control threshold values is shown in Table 2.

TABLE 2

| Network operation mode | Congestion control threshold value |
| --- | --- |
| 10 Mbps/10 Mbps | 69/69 |
| 100 Mbps/100 Mbps | 69/69 |
| 10 Mbps/100 Mbps | 122/16 |
| 100 Mbps/10 Mbps | 16/122 |

As two examples described above, the rule of thumb of determining a maximum value of congestion threshold given to each network port is that the network port operating at a relatively slower speed is given a smaller threshold value while the network port operating at a relatively faster speed is given a larger threshold value. Therefore, a specific network port can be prevented from of each network port. The faster port allows more transmission-waiting packets existed.

Figure 12:
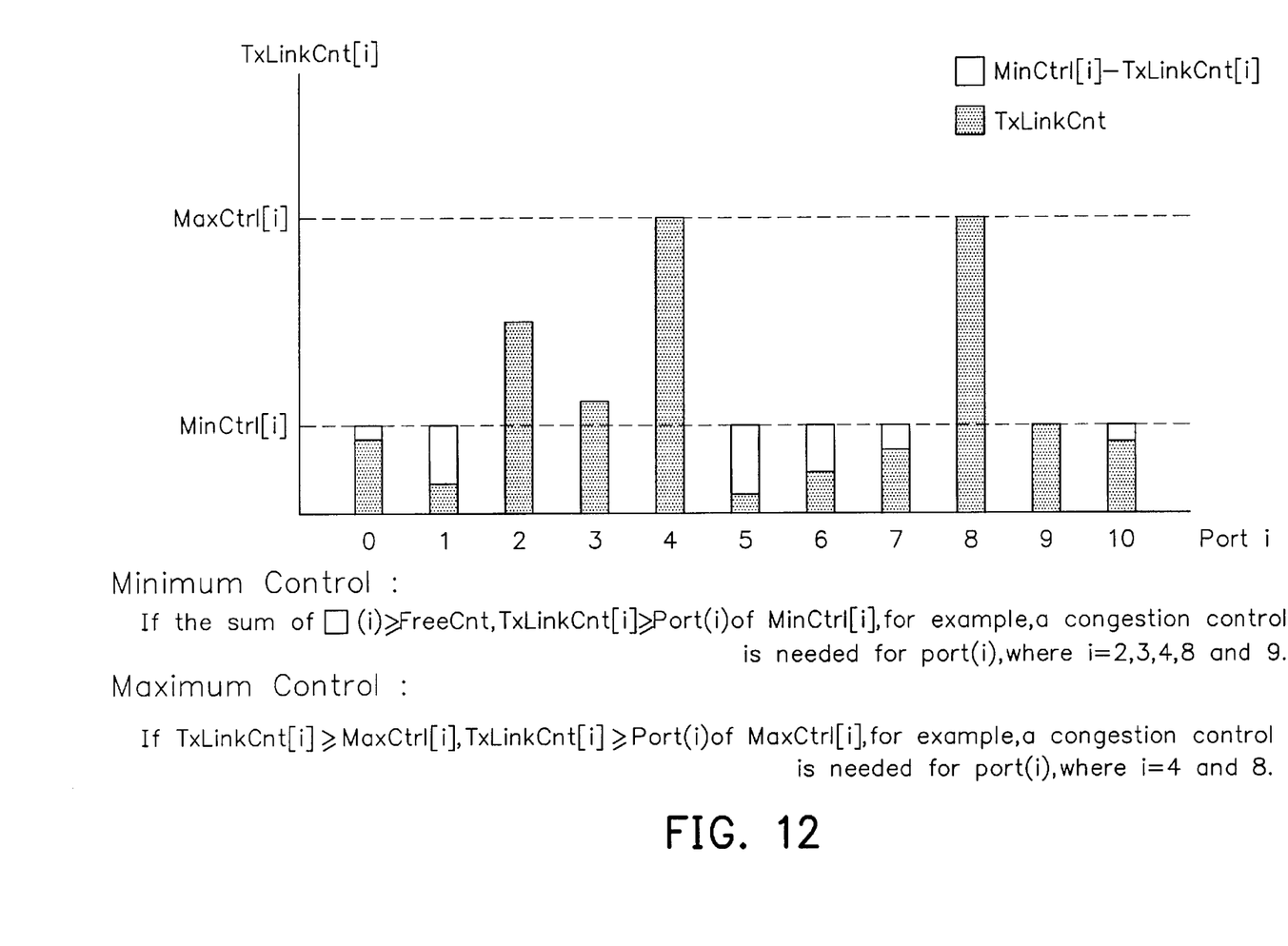
FIG. 12 is a schematic view showing a congestion control of a buffer manager according to a fifth embodiment of the invention.

The function of congestion control of the buffer manger further includes a maximum control and a minimum control to the threshold value. Referring to FIG. 12, Port i represents with network port; TxLinkCnt[i] represents the number of transmission-waiting packets of with network port; MaxCtrl [i] represents the maximum threshold value of the allowed transmission-waiting packets; and MinCtrl [I] represents the minimum threshold value of the required transmission-waiting packets.

When executing the minimum control of threshold value, if the sum of the number of packets remaining to reach a minimum of threshold value for each network port where the number of transmission-waiting packets does not reach the minimum of threshold value is larger or equal to a predetermined value, the other network ports in each of which the number of transmission-waiting packets is larger or equal to a minimum of threshold value need a congestion control as shown in Formula (1). When executing the maximum control of threshold value, the number of transmission-waiting packets of any one of the network ports is larger or equal to a maximum of threshold value the network port needs a congestion control as shown in Formula (2). Any packet which should be routed to the congested port will not be received and forwarding operation will not be progressed by the switch.

As can be known from the above-mentioned embodiments, the advantages of the invention are as follows:

(1) The invention has a function of combining the network system 10BASE with the network system 100BASE, thereby extending the use of the old system to the new system.

(2) The invention has a share memory structure, such that the capacitance of the memory required by the switch can be saved, resulting in enhancing the efficiency of the switch.

(3) The function of congestion control of the buffer manager not only prevents the buffer from overflowing but also avoids the loss of packets.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangement

What is claimed is:

1. An Ethernet switch having a share memory structure for selectively transmitting network packets, comprising:

a memory device for network packet accesses and routing data storage;

a memory controller coupled to the memory device for managing/controlling the network packets in the memory device;

a data switching controller coupled to the memory controller for selecting/learning packet routes; and two network ports coupled to the memory controller and the data switching controller;

wherein the memory controller comprises:

a memory interface coupled to the memory device, the data switch controller and the network ports for controlling data accesses of the memory device; and a memory manager coupled to the network ports for managing the memory device by use of the memory interface.

2. An Ethernet switch as claimed in claim 1, wherein the memory device comprises:

a routing table coupled to the memory controller for storing the routing data of the data switching controller via the memory controller; and a packet buffer coupled to the memory controller for the accesses of network packets required by each of the network ports via the memory controller.

3. An Ethernet switch as claimed in claim 1, wherein the memory manager comprises:
- a buffer table for recording the use statuses of the memory device by means of the network ports and the memory interface;
- a buffer manager coupled to the buffer table, thereby learning the use statuses of the packet buffer and managing the packet buffer.

4. An Ethernet switch having a share memory structure for selectively transmitting network packets, comprising:
- a memory device for network packet accesses and routing data storage;
- a memory controller coupled to the memory device for managing/controlling the network packets in the memory device;
- a data switching controller coupled to the memory controller for selecting/learning packet routes; and
- two network ports coupled to the memory controller and the data switching controller;
- wherein the data switching controller comprises:
  - a routing controller for selecting packet output routes of the network ports; and
  - a learning controller for storing packet input routes of the network ports.

5. An Ethernet switch as claimed in claim 4, wherein the routing controller selectively selects a corresponding network port in response to destination address data of received packet.

6. An Ethernet switch as claimed in claim 4, wherein the learning controller selectively selects a corresponding network port in response to source address data of received packet.

7. An Ethernet switch as claimed in claim 4, wherein the memory device comprises:
- a routing table coupled to the memory controller for storing the routing data of the data switching controller via the memory controller; and
- a packet buffer coupled to the memory controller for the accesses of network packets required by each of the network ports via the memory controller.

8. An Ethernet switch having a share memory structure for selectively transmitting network packets, comprising:
- a memory device for network packet accesses and routing data storage;
- a memory controller coupled to the memory device for managing/controlling the network packets in the memory device;
- a data switching controller coupled to the memory controller for selecting/learning packet routes; and
- two network ports coupled to the memory controller and the data switching controller;
- wherein each of the network port comprises:
  - the an Ethernet communication protocol controller for mainly implementing the functions specified by IEEE 802.3 section 4; and
  - a network packet data access controller for receiving and transmitting network packets.

9. An Ethernet switch as claimed in claim 8, wherein the Ethernet communication protocol controller comprises:
- a media independent interface;
- a reconciliation sub-layer; and
- a media access controller having receiving and transmitting functions which meet the specifications of IEEE 802.3 section 4.

10. An Ethernet switch as claimed in claim 8, wherein the network packet data access controller comprises:
- a receive direct memory access controller for receiving network packets; and
- a transmit direct memory access controller for transmitting network packets.

11. An Ethernet switch as claimed in claim 8, wherein the memory device comprises:
- a routing table coupled to the memory controller for storing the routing data of the data switching controller via the memory controller; and
- a packet buffer coupled to the memory controller for the accesses of network packets required by each of the network ports via the memory controller.

12. An Ethernet switch having a share memory structure for selectively transmitting network packets, comprising:
- a routing table;
- a packet buffer;
- a share memory access controller coupled to the routing table and the packet buffer, which consists of a means for arbitrating, a means for data multiplexing, a means for addressing and a means for access command controlling;
- a data switching controller coupled to the share memory access controller, which consists of a means for initializing, a means for arbitrating and a means for aging the routing table as well as a routing controller and a learning controller;
- more than two network ports, each of which is coupled to the share memory access controller and the data switching controller;
- a buffer manager coupled to the network ports; and
- a buffer table coupled to the buffer manager,
- wherein the routing table stores the routing data of the data switching controller by use of the share memory access controller; the packet buffer accepts network packets accesses of the network port by use of the share memory access controller; the buffer table records use statuses of the packet buffer by means of the network ports and the buffer manager; and the buffer manager learns use statuses of the packet buffer by means of the network ports and the share memory access controller and manages the packet buffer.

13. An Ethernet switch as claimed in claim 12, wherein each of the network ports comprising:
- an Ethernet communication protocol controller for mainly implementing the functions specified by IEEE 802.3 section 4; and
- a network packet data access controller for receiving and transmitting network packets.

14. An Ethernet switch as claimed in claim 13, wherein the Ethernet communication protocol controller comprises:
- a media independent interface;
- an reconciliation sub-layer; and
- a media access controller having receiving and transmitting functions which meet the specifications of the IEEE 802.3 section 4.

15. An Ethernet switch as claimed in claim 13, wherein the network packet data access controller comprises:
- a receive direct memory access controller for receiving network packets; and
- a transmit direct memory access controller for transmitting network packets.

* * * * *